United States Patent
Jo

(10) Patent No.: US 8,544,334 B2
(45) Date of Patent: Oct. 1, 2013

(54) SYSTEMS, METHODS, AND APPARATUS FOR COMPENSATING ATMOSPHERIC PRESSURE MEASUREMENTS IN FIRED EQUIPMENT

(75) Inventor: Tadao Jo, Missouri City, TX (US)

(73) Assignee: Yokogawa Corporation of America, Sugar Land, TX (US)

( * ) Notice: Subject to any disclaimer, the term of this patent is extended or adjusted under 35 U.S.C. 154(b) by 363 days.

(21) Appl. No.: 12/938,496

(22) Filed: Nov. 3, 2010

(65) Prior Publication Data
US 2012/0103101 A1 May 3, 2012

(51) Int. Cl.
*G01L 19/04* (2006.01)

(52) U.S. Cl.
USPC .............................. 73/708; 73/700

(58) Field of Classification Search
None
See application file for complete search history.

(56) References Cited

U.S. PATENT DOCUMENTS

| | | | |
|---|---|---|---|
| 3,486,834 A | 12/1969 | Roerden et al. | |
| 4,369,030 A | 1/1983 | Siccardi | |
| 4,385,887 A | 5/1983 | Yamamoto et al. | |
| 4,645,450 A | 2/1987 | West | |
| 4,926,698 A | 5/1990 | Owen | |
| 5,594,548 A | 1/1997 | Kobayashi et al. | |
| 5,658,140 A | 8/1997 | Kondou et al. | |
| 5,813,767 A | 9/1998 | Calabro et al. | |
| 5,878,741 A | 3/1999 | Dempsey et al. | |
| 5,984,998 A | 11/1999 | Ottesen et al. | |
| 7,101,172 B2 * | 9/2006 | Jaeschke | 431/19 |
| 7,119,308 B2 | 10/2006 | Kopel | |
| 7,252,806 B1 | 8/2007 | Merritt | |
| 7,447,250 B2 | 11/2008 | Kawasaki et al. | |
| 7,469,092 B2 * | 12/2008 | Sappey et al. | 385/147 |
| 7,536,274 B2 | 5/2009 | Heavner et al. | |
| 7,729,566 B2 * | 6/2010 | Sappey et al. | 385/13 |
| 7,735,743 B2 * | 6/2010 | Jaeschke | 236/11 |
| 7,787,123 B2 * | 8/2010 | Howell | 356/437 |
| 7,787,728 B2 * | 8/2010 | Masterson et al. | 385/123 |
| 8,261,733 B2 | 9/2012 | Hugghins | |
| 2003/0132389 A1 | 7/2003 | Von Drasek et al. | |
| 2009/0215375 A1 | 8/2009 | Hagensen | |
| 2010/0028819 A1 | 2/2010 | Knittel et al. | |
| 2010/0180502 A1 | 7/2010 | Koyama et al. | |
| 2011/0100349 A1 | 5/2011 | Hugghins | |
| 2011/0111352 A1 | 5/2011 | Hugghins | |
| 2012/0310419 A1 | 12/2012 | Hugghins | |

FOREIGN PATENT DOCUMENTS

| | | |
|---|---|---|
| WO | 2004090496 A2 | 10/2004 |
| WO | 2008106056 A1 | 9/2008 |

OTHER PUBLICATIONS

Search Report and Written Opinion for PCT/2011/056643 mailed Feb. 29, 2012.

\* cited by examiner

*Primary Examiner* — Lisa Caputo
*Assistant Examiner* — Jermaine Jenkins
(74) *Attorney, Agent, or Firm* — Sutherland Asbill & Brennan LLP

(57) ABSTRACT

Certain embodiments of the invention may include systems, methods, and apparatus for providing compensating atmospheric pressure measurements in fired equipment. According to an example embodiment of the invention, a method is provided compensating pressure measurements. The method includes providing a wind compensating ring tube having three or more apertures to equalize pressure inside the compensating ring tube, installing the wind compensating ring tube adjacent to a furnace, connecting a pressure transmission tube from the wind compensating ring tube to one or more pressure sensors, and transmitting pressure from inside the wind compensating ring tube to the one or more pressure sensors by the pressure transmission tube.

23 Claims, 6 Drawing Sheets

SYSTEMS, METHODS, AND APPARATUS FOR COMPENSATING ATMOSPHERIC PRESSURE MEASUREMENTS IN FIRED EQUIPMENT

RELATED APPLICATIONS

This application is related to application Ser. No. 12/938,498, filed concurrently with the present application on Nov. 3, 2010, entitled: "Systems, methods, and apparatus for determining airflow through a burner," the contents of which are hereby incorporated by reference in their entirety.

FIELD OF THE INVENTION

This invention generally relates to systems, methods, and apparatus for atmosphere pressure measurements, and in particular, to compensating atmospheric pressure measurements for wind effect in fired equipment.

BACKGROUND OF THE INVENTION

Conventional forced air feed furnaces utilize blowers and/or air feed passages to provide air to a burner section where fuel is combusted. Combustion parameters may be adjusted by varying the air/fuel mixture, for example, to obtain target efficiencies, minimum exhaust pollutants, etc. When it is desired to vary the combustion parameters of the furnace, the blower speed may be altered, the fuel feed pressure may be adjusted, and/or the air feed passage resistance may be varied to obtain the desired air/fuel mixture and volume.

Restrictive elements may be utilized to control the airflow velocity and/or volume through the furnace. For example, a restrictive throat may be utilized to increase the velocity of feed air entering the burner region, creating a pressure drop across the throat. The feed air velocity and/or volume through the throat can be affected by pressure in the combustion and exhaust regions. Outside atmospheric pressure and wind can affect the pressure in exhaust ports, and in turn, can affect the airflow at the burner. Consequently, the target fuel/air ratio can be difficult to maintain.

BRIEF SUMMARY OF THE INVENTION

Some or all of the above needs may be addressed by certain embodiments of the invention. Certain embodiments of the invention may include systems, methods, and apparatus for compensating atmospheric pressure measurements.

According to an example embodiment of the invention, a method is provided for compensating pressure measurements. The method includes providing a wind compensating ring tube having three or more apertures to equalize pressure inside the compensating ring tube, installing the wind compensating ring tube adjacent to a furnace, connecting a pressure transmission tube from the wind compensating ring tube to one or more pressure sensors, and transmitting pressure from inside the wind compensating ring tube to the one or more pressure sensors by the pressure transmission tube.

According to another example embodiment, a system is provided for compensating atmospheric pressure measurements for wind effect. The system includes a furnace, an exhaust stack associated with the furnace, one or more pressure sensors, and a wind compensating ring tube mounted to the exhaust stack and in communication with the one or more pressure sensors. The wind compensating ring tube includes three or more apertures spaced about equally around the circumference of the wind compensating ring tube to equalize atmospheric pressure inside the compensating ring tube. The system also includes a pressure transmission tube operable to transmit air pressure within the wind compensating ring tube to the one or more pressure sensors.

According to another example embodiment, an apparatus is provided for compensating atmospheric pressure measurements. The apparatus includes a wind compensating ring tube made from a substantially round hollow tube having three or more apertures for equalizing pressure inside the compensating ring tube. The apparatus also includes a pressure transmission tube operable to transmit air pressure within the wind compensating ring tube to one or more pressure sensors Other embodiments and aspects of the invention are described in detail herein and are considered a part of the claimed invention. Other embodiments and aspects can be understood with reference to the following detailed description, accompanying drawings, and claims.

BRIEF DESCRIPTION OF THE FIGURES

Reference will now be made to the accompanying tables and drawings, which are not necessarily drawn to scale, and wherein.

DETAILED DESCRIPTION OF THE INVENTION

Embodiments of the invention will be described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout. Certain embodiments of the invention may enable atmospheric pressure measurements. According to certain example embodiments, atmospheric pressure may be measured with compensation for the effects of wind.

According to example embodiments of the invention, various arrangements for a wind compensating ring tube are provided for eliminating atmospheric pressure measurement errors due to wind, and will now be described with reference to the accompanying figures.

Figure 1:
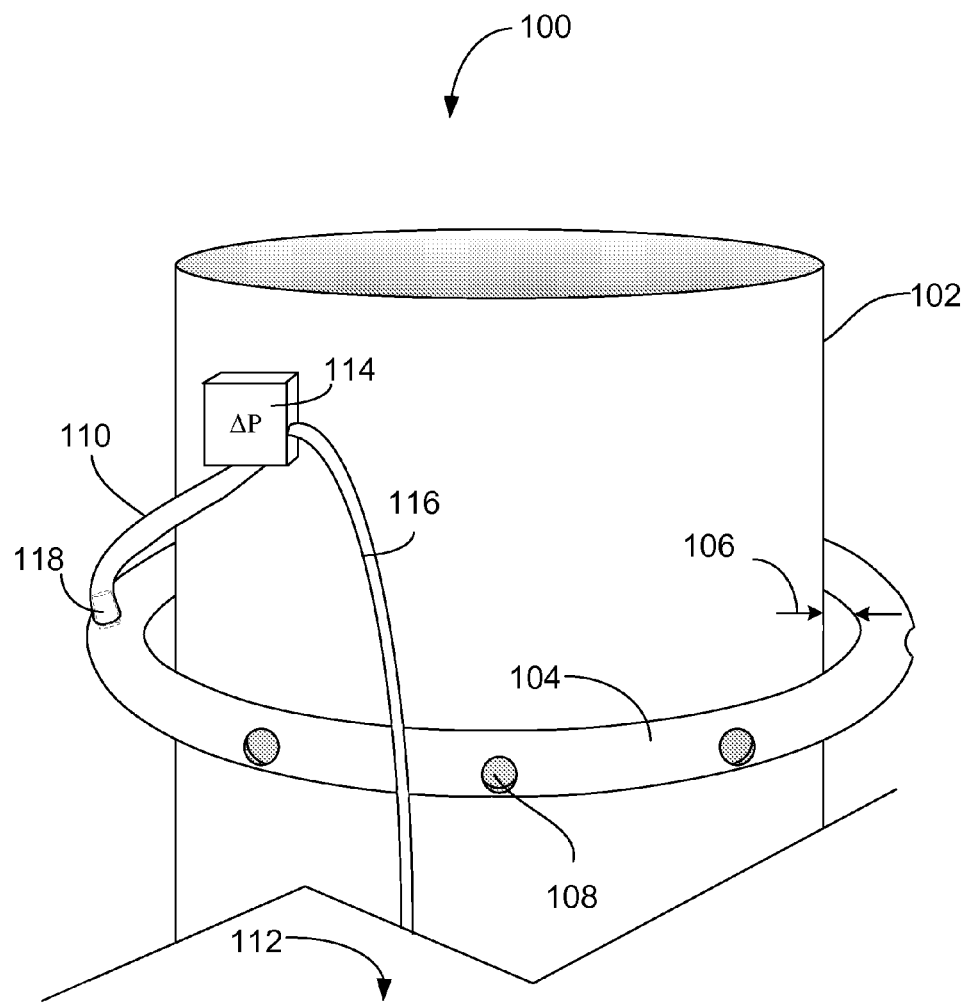
FIG. 1 is an illustrative perspective view diagram of an atmospheric pressure compensating ring system, according to an example embodiment of the invention.

FIG. 1 illustrates a perspective view diagram of an atmospheric pressure compensating ring system 100, according to an example embodiment of the invention. According to example embodiments of the invention, a wind compensating ring tube 104 may surround or be placed adjacent to a structure 102 associated with fired equipment. For example, the structure 102 may be a furnace stack. In accordance with example embodiments of the inventions, a furnace may be defined as a combustion chamber or enclosed space where combustion process takes place with one or more burners installed. The furnace stack may allow exhaust to vent from the furnace or fired equipment.

According to example embodiments of the invention, the ring tube 104 may be hollow, and may include three or more apertures 108, spaced approximately equally around its circumference to allow atmospheric air to enter an inner portion of the ring tube 104. In an example embodiment, the ring tube 104 may be made from tubing approximately one half inch (1.3 cm) in diameter. In other example embodiments, the ring tube 104 may be made from tubing having diameters ranging from approximately one-quarter inch (0.6 cm) to approximately two inches (5.1 cm) in diameter.

According to example embodiments of the invention, the ends of the ring tube 104 may be joined to create an endless hollow loop. According to an example embodiment, the apertures 108 may be formed by drilling (horizontally or parallel to the plane formed by the ring) through the outer wall of the ring tube 104 without penetrating the inner wall. According to an example embodiment, the diameter of the apertures 108 may be approximately one eighth inch (0.3 cm). In other example embodiments, the apertures 108 may range from approximately one sixteenth of an inch (0.16 cm) to approximately one half inch (1.3 cm) depending on the diameter of the ring.

According to an example embodiment of the invention, wind acting on the ring tube 104 may cause a high pressure in the apertures 108 corresponding to the up-wind portion of the ring tube 108, while the apertures 108 corresponding to the down-wind portion of the ring tube 104 may experience a low pressure. The air pressure within the ring tube 104 may be an approximate average of the up-wind and down-wind pressures, according to an example embodiment of the invention. In an example embodiment, the average pressure in the tube is the atmospheric pressure without the wind effect. According to certain embodiments of the invention, the ring tube 104 may be installed so that is substantially horizontal.

The ring tube 104 may also include a hollow tubing connector 118, approximately one fourth inch (0.6 cm) in diameter that may provide a passageway to the inner portion of the ring tube 104. The tubing connector 118 may also provide a hose fitting for attaching a compensating ring pressure transmission tube 110. According to an example embodiment of the invention, the compensating ring pressure transmission tube 110 may be approximately one fourth inch (0.6 cm) in diameter and may connect to a pressure sensor 114 for measuring the air pressure within the ring tube 104.

Example embodiments of the invention may include determining pressure at one or more regions within the furnace relative to the pressure inside a wind compensating ring tube 104, and controlling the furnace based at least in part on a pressure differential between the determined pressure inside the wind compensating ring and the determined pressure from the one or more regions within the furnace.

Example embodiments of the inventions include controlling a furnace based at least in part on transmitting pressure from inside the ring tube 104 to one or more pressure sensors 114. In an example embodiment, controlling the furnace may be based on a pressure differential between the transmitted pressure from inside the ring tube 104 and a pressure transmitted from one or more regions associated with the furnace. For example, outside atmospheric pressure and wind can affect the pressure in exhaust ports 102, which in turn, can affect the airflow through the burner. In an example embodiment, the ring tube 104 may provide an accurate measurement of atmospheric pressure in the presence of moving air (wind). According to an example embodiment, a differential pressure measurement between the ring tube 104 and one or more regions within the furnace can be utilized by a processor, for example, to control the furnace air and/or gas flow to minimize the affects of varying atmospheric pressure or wind, and/or to provide stable operating controls for the furnace.

According to example embodiments of the invention, the pressure sensor 114 may be a differential pressure sensor operable for measuring a pressure drop between the outside atmosphere, and a region within a furnace 112 or fired equipment, for example. In accordance with an example embodiment of the invention, a furnace region pressure transmission tube 116 may also connect to the pressure sensor 114, and the pressure sensor 114 may measure a pressure differential between the inside of the ring tube 104 and a location within the furnace 112, for example, or at any desired location that is suitable for placing the end of the furnace region pressure transmission tube 116. In certain embodiments, the pressure sensor 114 may be a so-called draft range differential pressure transmitter, such as model EJA120A produced by the Yokogawa Electric Company.

According to an example embodiment, a pressure compensation measurement system may be provided, assembled, or installed for example, by providing a wind compensating ring tube having three or more apertures to equalize pressure inside the compensating ring tube, installing the wind compensating ring tube adjacent to a furnace, connecting a pressure transmission tube from the wind compensating ring tube to one or more pressure sensors, and connecting a furnace region pressure transmission tube from one or more regions within the furnace to the one or more pressure sensors. According to example embodiments, measurement signals from the one or more sensors are operable to control at least one parameter associated with the furnace. The parameters may include air flow, air inlet size, restriction diameters, fuel flow, fuel distribution, burner position, etc.

In an example embodiment, when the ring tube 104 is configured to surround a stack 102, for example as shown in FIG. 1, the hoop diameter of the ring tube 104 may be slightly larger than the outer diameter of the stack 102 by approximately 6 to 12 inches (15 to 30 cm) so that there is a gap 106 of approximately 3 to 6 inches (8 to 15 cm) between the outer surface of the stack 102 and the inner surface of the ring tube 104. In an example embodiment, the ring tube 104 may be sized at any convenient diameter to provide easy installation, and the gap 106 dimension may not be critical to the operation of the ring tube 104.

Figure 2:
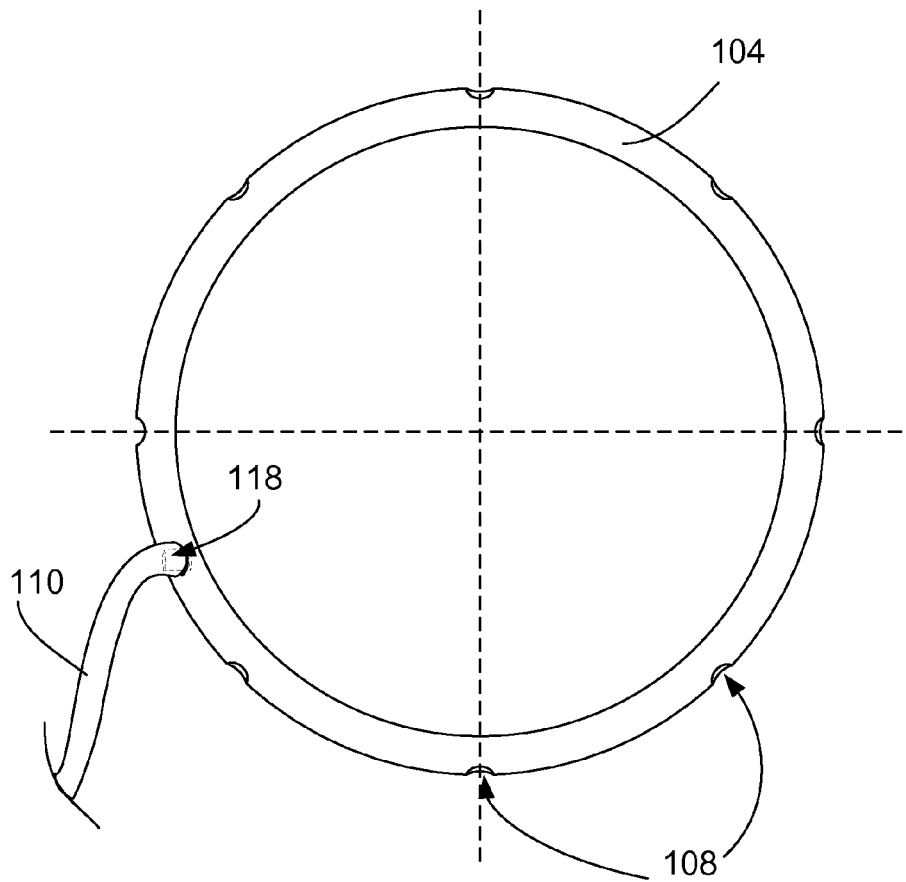
FIG. 2 is an illustrative top view diagram of an atmospheric pressure compensating ring, according to an example embodiment of the invention.

FIG. 2 depicts an example top view of the ring tube 104 for clarity. Also shown in this figure are apertures 108, the hollow tubing connector 118, and the pressure transmission tube 110 connected to the hollow tubing connector 118. According to certain example embodiments, the ring tube 104 may include three or more apertures 108, spaced approximately equally around the outer circumference of the ring tube 104. In certain example embodiments, the ring tube 104 may include eight apertures 108 as shown in FIG. 2. In another example embodiment, the ring tube may include 16 apertures 108. According to example embodiments of the invention the apertures 108 may be drilled through the outer diameter wall of the ring tube 104 and may approximately bisect the plane formed by the ring tube 104. In certain example embodiments, the ring tube 104 may include one or more drain holes on the underside to permit water to drain from the inside of the ring tube 104.

Figure 3:
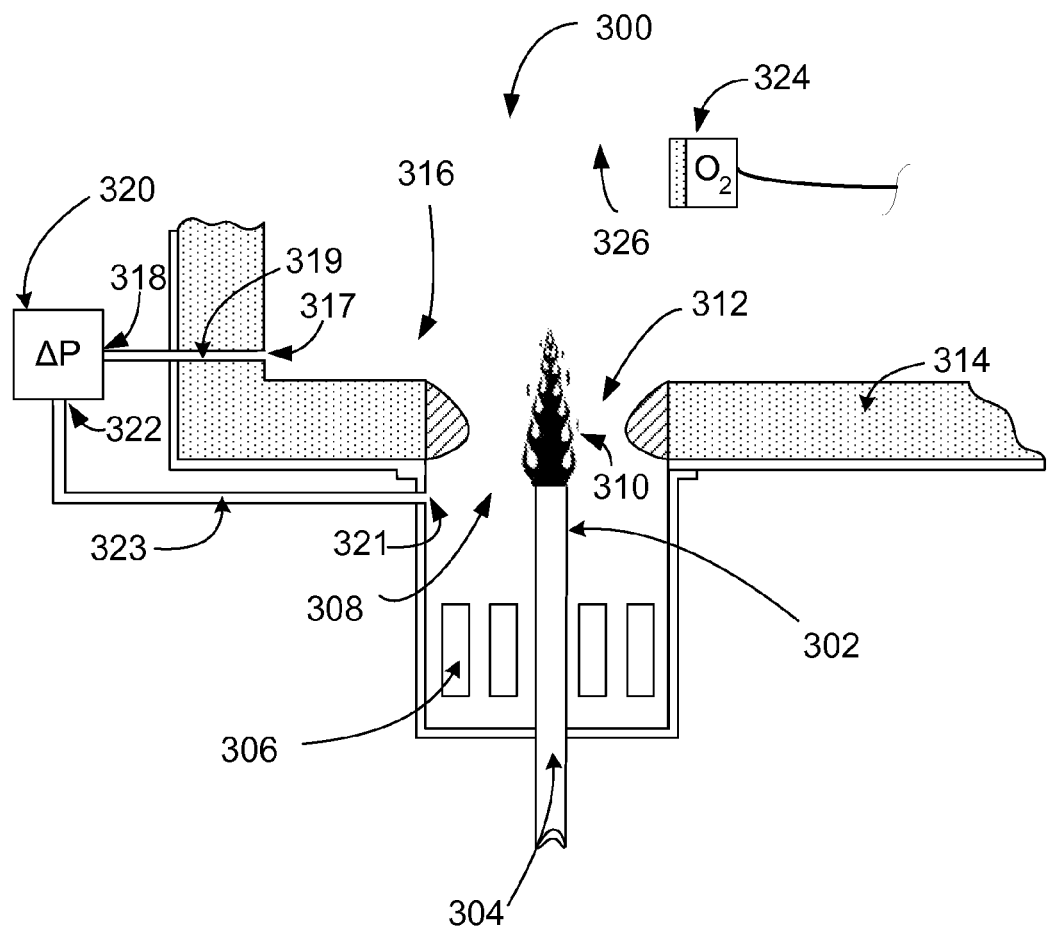
FIG. 3 is an illustrative diagram of a furnace burner system, according to an example embodiment of the invention.

FIG. 3 depicts a diagram of a furnace burner system 300, according to example embodiments of the inventions. In an example embodiment, the furnace burner system 300 may include a fuel pipe 302 for delivering fuel to the flame 310 area, a furnace refractory 314, a burner throat 312, a burner exit region 316, and a burner exit region 326. According to example embodiments of the invention, the furnace burner system 300 may also include a differential pressure sensor 320 for measuring a pressure drop across the burner throat 312, and the pressure drop may in turn be utilized to determine and adjust the airflow through the burner. According to an example embodiment of the invention, the a relative airflow change may be related, at least in part, to the square root of a differential pressure measured across the burner throat 312 by the differential pressure sensor 320.

In an example embodiment, a first end 317 of a burner exit pressure transmission tube 319 may be in communication with the burner exit region 316, and the second end 318 of the burner exit pressure transmission tube 319 may be attached to one inlet of the differential pressure sensor 320. According to an example embodiment, the pressure in the burner exit region 316 may be communicated through the burner exit pressure transmission tube 319 to the differential pressure sensor 320. In an example embodiment, a first end 321 of an inlet pressure transmission tube 323 may be in communication with the air inlet region 308, and the second end 322 of the inlet pressure transmission tube 323 may be attached to another inlet of the differential pressure sensor 320. According to an example embodiment, the pressure in the air inlet region 308 may be communicated through the inlet pressure transmission tube 323 to the differential pressure sensor 320.

According to an example embodiment, fired equipment may be controlled by measuring the differential pressure between an air inlet region 308 and a burner exit region 326 associated with a furnace, determining airflow through the burner based at least in part on the measured differential pressure, and controlling one or more parameters associated with the furnace based on the determined airflow. In an example embodiment, the parameters may include air flow, air inlet size, restriction diameters, fuel flow, fuel distribution, burner position, etc.

According to an example embodiment, airflow through a burner may be determined and controlled by providing pressure sensors that can measure a differential pressure across the burner throat 312. Providing, installing, or assembling the system to measure the airflow may include one or more of the following steps: installing a first end of an inlet pressure transmission tube 321 in an air inlet region 308 of a furnace burner system, installing a first end of a burner pressure transmission tube 318 in a burner exit region 316 of the furnace burner system, connecting a second end of the inlet pressure transmission tube 322 to a first pressure sensor port, and connecting a second end of the burner pressure transmission tube 318 to a second pressure sensor port. According to an example embodiment, differential pressure measurement signals from the first and second pressure sensor ports may be operable to control at least one parameter associated with the furnace. In an example embodiment, the parameters may include air flow, air inlet size, restriction diameters, fuel flow, fuel distribution, burner position, etc.

In an example embodiment of the invention, fuel flow 304 to the furnace burner system 300 may be controlled by modifying the fuel pressure, or by adjusting a fuel control valve in communication with the fuel pipe 302. The fuel transported by the fuel pipe 302 may be ignited to produce a flame 310 near the burner throat 312. According to an example embodiment, the quality and intensity of the flame 310 may be controlled at least in part by controlling the fuel flow 304 through the fuel pipe 302, and/or by controlling the amount of air flowing through the air inlet region 308. In accordance with an example embodiment, airflow in the air inlet region 308 may be controlled by one or more air inlets 306, which may vary in size to adjust the airflow. In certain embodiments of the invention, the airflow may be controlled by adjusting the speed of a forced-air fan, for example. In other embodiments, the airflow may be controlled by a combination of a forced-air fan and one or more variable air inlet 306 apertures. In certain embodiments of the invention, the airflow may be controlled based on the differential pressure measured across a restriction within the furnace or fired equipment.

According to an example embodiment of the invention, the furnace burner system 300 may also include an oxygen sensor 324 near the furnace exit region. The oxygen sensor 324 may be utilized in conjunction with the differential pressure sensor 320 to provide information to a furnace control system for adjusting the fuel flow 304 and/or the airflow to the furnace burner system 300.

Figure 4:
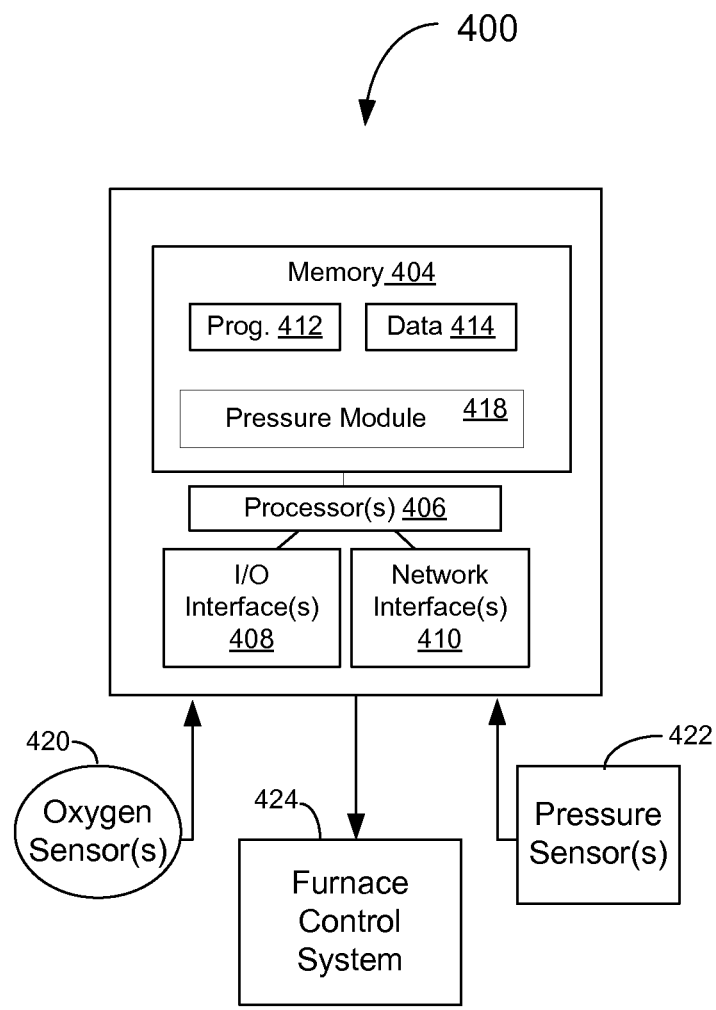
FIG. 4 is a block diagram of a sensor processing system, according to an example embodiment of the invention.

FIG. 4 is a block diagram of a sensor processing system 400, according to an example embodiment of the invention. In an example embodiment, the sensor processing system 400 may include a memory 404, one or more processors 406, one or more input/output interfaces 408, and one or more network interfaces 410. The memory 404 may be in communication with the one or more processors 406 and may include machine-readable program code 412 and data 414. In an example embodiment, the memory may include a pressure module 418 for determining the burner airflow based on input from pressure sensors 422 and/or oxygen sensors 420. According to an example embodiment, the sensor processing system may also include (or be in communication with) a furnace control system 424. In an example embodiment, the furnace control system 424 may control the airflow and or the fuel flow to the furnace based at least in part on the processed information received from the pressure sensors 422 and/or the oxygen sensors 420. For example, the furnace control system 424 may provide signals for controlling fuel pressure and/or rate. The furnace control system 424 may also provide signals for controlling the airflow, for example, by adjusting forced air and/or modifying air inlet apertures in the air intake portion of the furnace.

Figure 5:
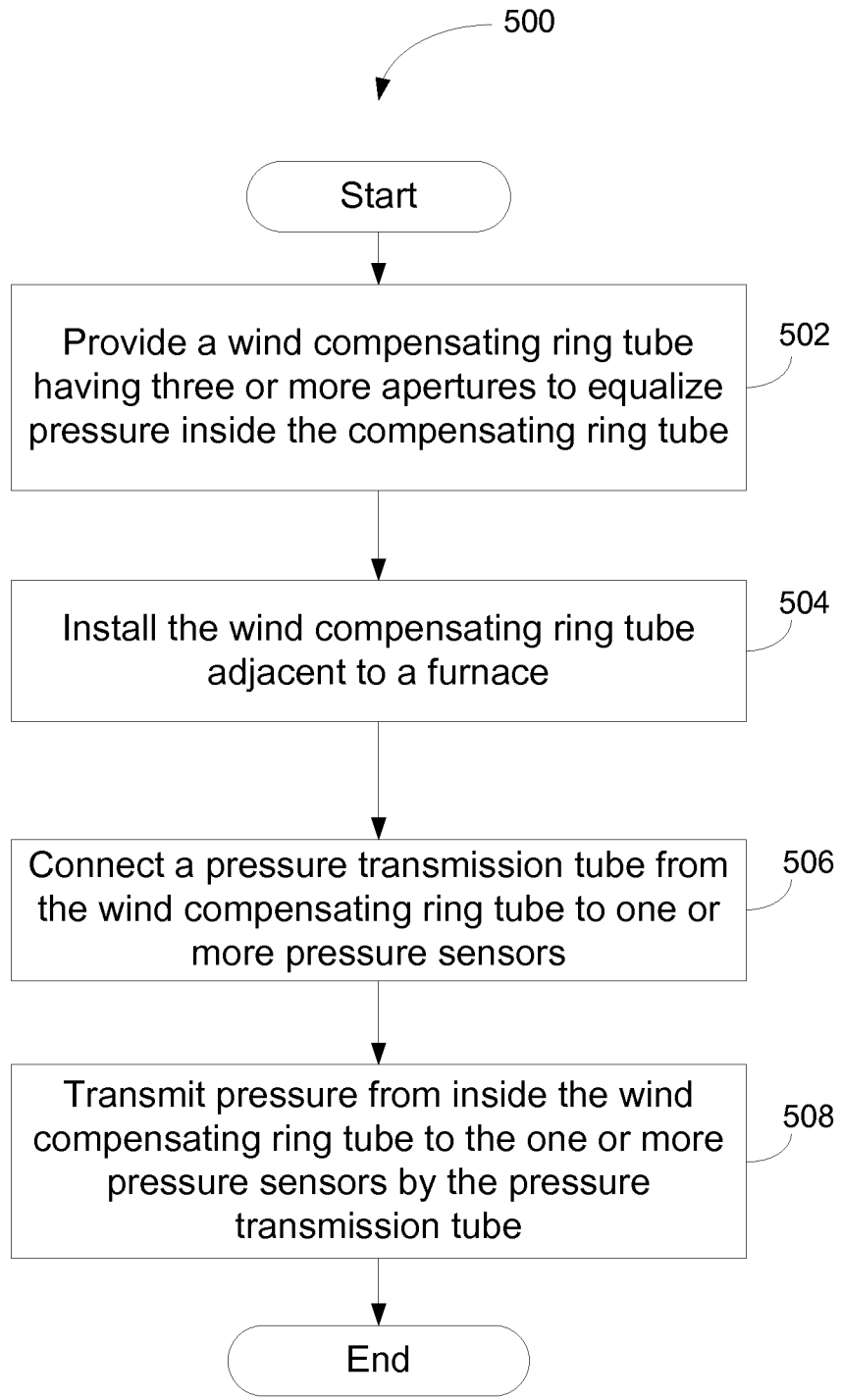
FIG. 5 is a flow diagram of an example method, according to an example embodiment of the invention.

An example method 500 for compensating atmospheric pressure measurements will now be described with reference to the flow diagram of FIG. 5. The method 500 starts in block 502, where an example embodiment of the invention includes forming three or more apertures in a wind compensating ring tube to equalize atmospheric pressure inside the compensating ring tube. In block 504, the method 500 includes installing the wind compensating ring tube adjacent to a furnace. In block 506, the method 500 includes connecting a pressure transmission tube from the wind compensating ring tube to one or more pressure sensors. In block 508, the method 500 includes transmitting pressure from inside the wind compensating ring tube to the one or more pressure sensors by the pressure transmission tube. The method 500 ends after block 508.

Figure 6:
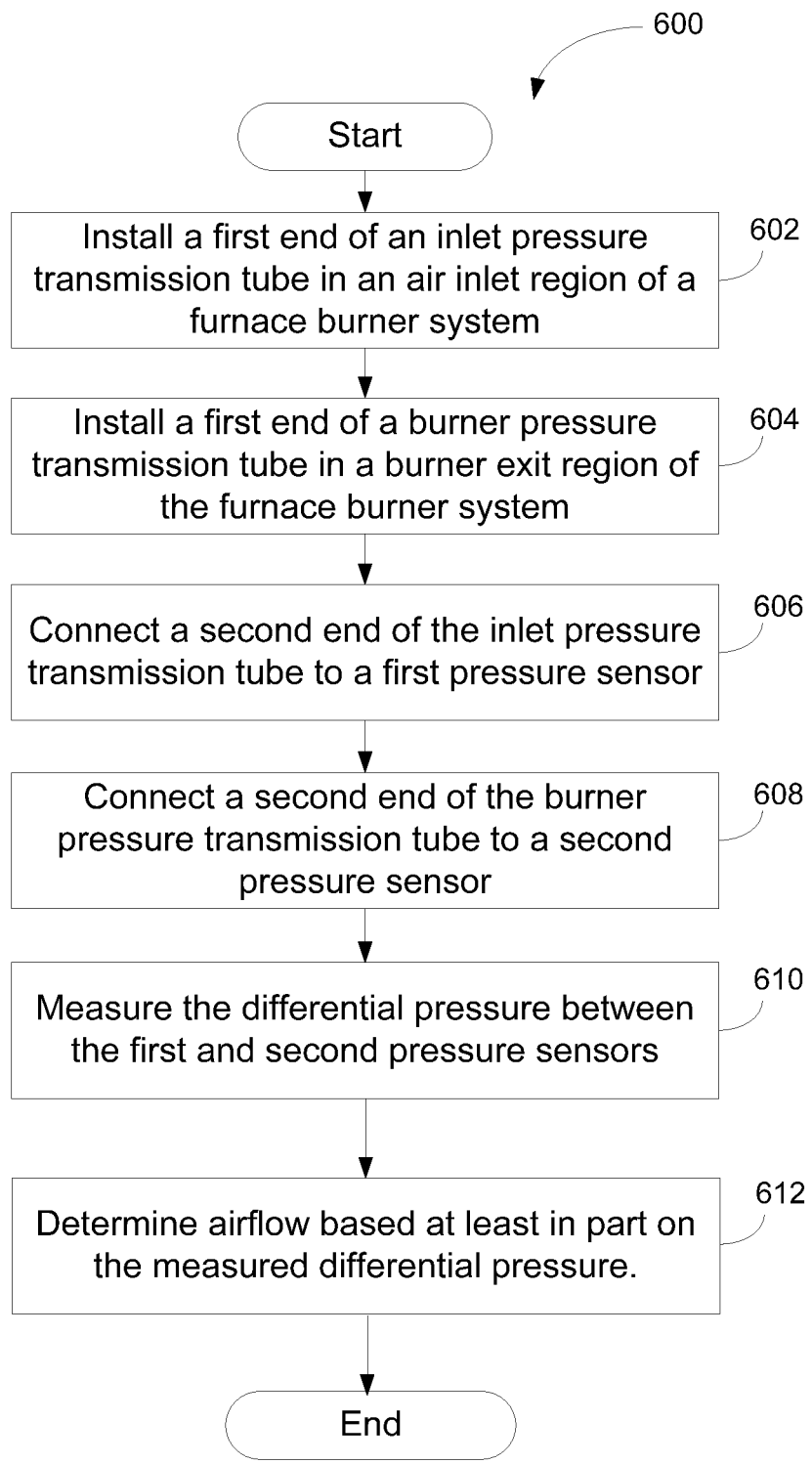
FIG. 6 is another flow diagram of an example method, according to an example embodiment of the invention.

Another example method 600 for determining airflow through a burner will now be described with reference to the flow diagram of FIG. 6. The method 600 starts in block 602, where an example embodiment of the invention includes installing a first end of an inlet pressure transmission tube in an air inlet region of a furnace burner system. In block 604, the method 600 includes installing a first end of a burner pressure transmission tube in a burner exit region of the furnace burner system. In block 606, the method 600 includes connecting a second end of the inlet pressure transmission tube to a first port of a pressure sensor. In block 608, the method 600 includes connecting a second end of the burner pressure transmission tube to a second port of a pressure sensor. In block 610, the method 600 includes measuring the differential pressure between the first and second ports of the pressure sensor. In block 612, the method 600 includes determining airflow based at least in part on the measured differential pressure. Method 600 ends after block 612.

Accordingly, example embodiments of the invention can provide the technical effects of creating certain systems, methods, and apparatus that compensate for air pressure measurement differences between up-wind and down-wind regions in the atmosphere. Example embodiments of the invention can provide the further technical effects of providing systems, methods, and apparatus for providing accurate outside air pressure measurements, even during windy conditions. Example embodiments of the invention can provide the further technical effects of providing systems, methods, and apparatus for installing a wind compensating ring tube adjacent to a structure associated with fired equipment so that a stable reliable furnace pressures are measured. For use in combustion control.

In example embodiments of the invention, the atmospheric pressure compensating ring system 100, the furnace burner system 300, and the sensor processing system 400 may include any number of hardware and/or software applications that are executed to facilitate any of the operations.

In example embodiments, one or more I/O interfaces may facilitate communication between the atmospheric pressure compensating ring system 100, the furnace burner system 300, the sensor processing system 400, and one or more input/output devices. For example, a universal serial bus port, a serial port, a disk drive, a CD-ROM drive, and/or one or more user interface devices, such as a display, keyboard, keypad, mouse, control panel, touch screen display, microphone, etc., may facilitate user interaction with the atmospheric pressure compensating ring system 100, the furnace burner system 300, and the sensor processing system 400. The one or more I/O interfaces may be utilized to receive or collect data and/or user instructions from a wide variety of input devices. Received data may be processed by one or more computer processors as desired in various embodiments of the invention and/or stored in one or more memory devices.

One or more network interfaces may facilitate connection of the atmospheric pressure compensating ring system 100, the furnace burner system 300, and/or the sensor processing system 400 inputs and outputs to one or more suitable networks and/or connections; for example, to the connections that facilitate communication with any number of sensors associated with the system. The one or more network interfaces may further facilitate connection to one or more suitable networks; for example, a local area network, a wide area network, the Internet, a cellular network, a radio frequency network, a Bluetooth™ enabled network, a Wi-Fi™ enabled network, a satellite-based network, any wired network, any wireless network, etc., for communication with external devices and/or systems.

As desired, embodiments of the invention may include the atmospheric pressure compensating ring system 100, the furnace burner system 300, and the sensor processing system 400 with more or less of the components illustrated in FIGS. 1, 2, 3, and 4.

The invention is described above with reference to block and flow diagrams of systems, methods, apparatuses, and/or computer program products according to example embodiments of the invention. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, or may not necessarily need to be performed at all, according to some embodiments of the invention.

These computer-executable program instructions may be loaded onto a general-purpose computer, a special-purpose computer, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks. As an example, embodiments of the invention may provide for a computer program product, comprising a computer-usable medium having a computer-readable program code or program instructions embodied therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

While the invention has been described in connection with what is presently considered to be the most practical and various embodiments, it is to be understood that the invention is not to be limited to the disclosed embodiments, but on the contrary, is intended to cover various modifications and equivalent arrangements included within the scope of the appended claims. Although specific terms are employed herein, they are used in a generic and descriptive sense only and not for purposes of limitation.

This written description uses examples to disclose the invention, including the best mode, and to enable any person skilled in the art to practice the invention, including making and using any devices or systems and performing any incorporated methods. The patentable scope of the invention is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The claimed invention is:

1. A method for compensating pressure measurements, comprising:
   providing a wind compensating ring tube having three or more apertures to equalize pressure inside the wind compensating ring tube;
   installing the wind compensating ring tube adjacent to a furnace;
   connecting a pressure transmission tube from the wind compensating ring tube to one or more pressure sensors; and
   transmitting pressure from inside the wind compensating ring tube to the one or more pressure sensors by the pressure transmission tube.

2. The method of claim 1, further comprising measuring the transmitted pressure with the one or more pressure sensors.

3. The method of claim 1, wherein providing the wind compensating ring tube with three or more apertures comprises forming the three or more apertures about equally spaced around the circumference of the wind compensating ring tube.

4. The method of claim 3, wherein forming three or more apertures comprises forming apertures in the wind compensating ring tube, wherein the apertures are about 2 mm to about 5 mm in diameter.

5. The method of claim 3, wherein forming three or more apertures comprises forming apertures in an outer surface of the wind compensating ring tube, wherein the outer surface bisects a plane of the wind compensating ring tube.

6. The method of claim 1, wherein installing the wind compensating ring tube comprises substantially surrounding a structure associated with the furnace with the wind compensating ring tube.

7. The method of claim 1, wherein installing the wind compensating ring tube comprises positioning a plane of the wind compensating ring tube to be substantially horizontal.

8. The method of claim 1, wherein connecting the pressure transmission tube from the wind compensating ring tube to one or more pressure sensors comprises connecting the pressure transmission tube to the wind compensating ring tube by a hollow tubing connector in communication with an inner volume of the wind compensating ring tube.

9. The method of claim 1, further comprising controlling the furnace based at least in part on the transmitted pressure from inside the wind compensating ring tube to the one or more pressure sensors.

10. The method of claim 9, wherein controlling the furnace is based at least in part on a pressure differential between the transmitted pressure from inside the wind compensating ring tube and a pressure transmitted from one or more regions associated with the furnace.

11. A system for compensating atmospheric pressure measurements for wind effect, comprising:
   a furnace;
   an exhaust stack associated with the furnace;
   one or more pressure sensors;
   a wind compensating ring tube mounted to the exhaust stack and in communication with the one or more pressure sensors, wherein the wind compensating ring tube comprises three or more apertures spaced about equally around the circumference of the wind compensating ring tube to equalize atmospheric pressure inside the wind compensating ring tube; and
   a pressure transmission tube operable to transmit air pressure within the wind compensating ring tube to the one or more pressure sensors.

12. The system of claim 11, wherein the three or more apertures are about 2 mm to about 5 mm in diameter.

13. The system of claim 11, wherein the wind compensating ring tube encircles or is adjacent to the exhaust stack associated with the furnace.

14. The system of claim 11, wherein the three or more apertures penetrate an outer surface of the wind compensating ring tube, wherein the outer surface bisects a plane of the wind compensating ring tube.

15. The system of claim 11, wherein a plane of the wind compensating ring tube is substantially horizontal.

16. The system of claim 11, further comprising a hollow tubing connector in communication with an inner volume of the wind compensating ring tube and operable for attaching the pressure transmission tube to wind compensating ring tube for transmitting air pressure within the wind compensating ring tube to the one or more pressure sensors.

17. An apparatus for compensating atmospheric pressure measurements for wind effect, comprising:
   a wind compensating ring tube comprising a substantially round hollow tube having three or more apertures for equalizing pressure inside the wind compensating ring tube; and
   a pressure transmission tube operable to transmit air pressure within the wind compensating ring tube to one or more pressure sensors.

18. The apparatus of claim 17, wherein the three or more apertures are spaced about equally around an outer circumference of an outer surface bisecting a plane of the wind compensating ring tube, and wherein the apertures are about 2 mm to about 5 mm in diameter.

19. The apparatus of claim 17, wherein the hollow tube comprises an inner diameter of approximately 12 mm to 50 mm, and wherein the hollow tube is formed in a circle and joined at the ends.

20. The apparatus of claim 17, wherein a plane of the wind compensating ring tube is substantially horizontal.

21. The apparatus of claim 17, further comprising a hollow tubing connector in communication with an inner volume of the wind compensating ring tube and operable for attaching the pressure transmission tube to the wind compensating ring tube for transmitting air pressure within the wind compensating ring tube to the one or more pressure sensors.

22. A method for controlling fired equipment, comprising:
   determining pressure from one or more regions within a furnace relative to pressure inside a wind compensating ring tube associated with the furnace; and
   controlling the furnace based at least in part on the determined pressure from the one or more regions.

23. A method for compensating pressure measurements, comprising:
   providing a wind compensating ring tube having three or more apertures to equalize pressure inside the wind compensating ring tube;
   installing the wind compensating ring tube adjacent to a furnace;
   connecting a pressure transmission tube from the wind compensating ring tube to one or more pressure sensors; and
   connecting a furnace pressure transmission tube from one or more regions within the furnace to the one or more pressure sensors, wherein measurement signals from the one or more pressure sensors are operable to control at least one parameter associated with the furnace.

* * * * *